(12) United States Patent
Lawrence et al.

(10) Patent No.: US 7,765,705 B2
(45) Date of Patent: Aug. 3, 2010

(54) METHODS AND DEVICES FOR CHARACTERIZING A SURFACE

(75) Inventors: Matthew J. Lawrence, San Francisco, CA (US); Alexander F. Hoermann, Menlo Park, CA (US); David R. Mills, Palo Alto, CA (US); Scott P. Phillips, Marina Del Rey, CA (US); Scott J. Sharpe, Berkeley, CA (US)

(73) Assignee: Areva Solar, Inc., Mountain View, CA (US)

(*) Notice: Subject to any disclaimer, the term of this patent is extended or adjusted under 35 U.S.C. 154(b) by 35 days.

(21) Appl. No.: 12/132,545

(22) Filed: Jun. 3, 2008

(65) Prior Publication Data

US 2009/0293293 A1 Dec. 3, 2009

(51) Int. Cl.
*G01B 7/34* (2006.01)
(52) U.S. Cl. .......................... 33/343; 33/533
(58) Field of Classification Search .................. 33/343, 33/365, 366.11, 391, 397, 533, 534
See application file for complete search history.

(56) References Cited

U.S. PATENT DOCUMENTS

| | | | | |
|---|---|---|---|---|
| 3,727,177 A | * | 4/1973 | Fuller et al. | 33/397 |
| 4,949,467 A | * | 8/1990 | Oman et al. | 33/397 |
| 5,666,736 A | * | 9/1997 | Wen | 33/391 |
| 5,826,345 A | * | 10/1998 | Hendricks | 33/365 |
| 6,449,856 B1 | * | 9/2002 | Matsumoto et al. | 33/365 |
| 6,792,685 B1 | * | 9/2004 | Ng et al. | 33/286 |
| 7,178,377 B2 | * | 2/2007 | Suzuki | 33/391 |
| 7,240,675 B2 | | 7/2007 | Eickhoff | |
| 7,370,428 B2 | * | 5/2008 | Decker, Jr. | 33/366.11 |
| 7,428,780 B2 | * | 9/2008 | Lemp et al. | 33/366.11 |
| 2002/0053144 A1 | * | 5/2002 | Matsumoto et al. | 33/391 |
| 2005/0217127 A1 | * | 10/2005 | Hermann | 33/365 |
| 2007/0245579 A1 | * | 10/2007 | Decker | 33/366.11 |

FOREIGN PATENT DOCUMENTS

WO 2008092194 A1 8/2008
WO 2008092195 A1 8/2008

* cited by examiner

*Primary Examiner*—G. Bradley Bennett
(74) *Attorney, Agent, or Firm*—Patent Law Group LLP; Rachel V. Leiterman

(57) ABSTRACT

A measuring device comprising a base, feet connected to the base, and an inclinometer mounted on the base is used to characterize a surface. The feet are placed in direct contact with the surface at a predetermined position. The inclinometer measures the angle of the surface relative to gravity at the predetermined position. In some embodiments, multiple measuring devices are connected to an arm, in order to measure different positions on the surface simultaneously. The arm may be moved by an actuator to the next predetermined position on the surface. In some embodiments, multiple measuring devices are connected to a frame that is substantially the same size as the surface to be characterized, such that the entire surface can be characterized without moving the frame.

18 Claims, 4 Drawing Sheets

METHODS AND DEVICES FOR CHARACTERIZING A SURFACE

BACKGROUND

Solar power may be used to produce electricity by using mirrors to concentrate solar radiation on one or more receivers. In some examples, the sunlight heats a fluid in the receivers, producing a high pressure gas either directly by boiling the fluid, or indirectly by running the heated fluid through one or more heat exchangers to produce a high pressure gas, such as steam. The gas turns one or more turbines which power electrical generators. In other examples, the receiver includes one or more photovoltaic devices that absorb concentrated sunlight and directly generate electricity.

The efficiency of such arrangements can be improved by precisely characterizing surfaces including optical surfaces such as mirrors, support surfaces such as the frames or platforms on which mirrors are mounted or ribs that support the mirrors, and manufacturing surfaces such as tables or molds used to form curved mirrors. Precisely characterizing such surfaces permits the optical performance of the devices to be accurately modeled, thereby improving the accuracy with which solar radiation is reflected onto the receivers.

SUMMARY

Embodiments of the invention are directed to mechanical, rather than optical, methods and devices for characterizing surfaces such as optical surfaces (particularly mirrors), support surfaces, and manufacturing surfaces. Some embodiments use a measuring device comprising a base, feet connected to the base, and an inclinometer mounted on the base. The feet are placed in direct contact with the surface at a predetermined position. The inclinometer measures the angle of the surface relative to gravity at the predetermined position. In some embodiments, multiple measuring devices are connected to an arm, in order to measure different positions on the surface simultaneously. The arm may be moved by an actuator to the next predetermined position on the surface. In some embodiments, multiple measuring devices are connected to a frame that is substantially the same size as the surface to be characterized, such that the entire surface can be characterized without moving the frame.

Measuring devices according to embodiments of the invention are accurate and inexpensive to manufacture from readily available parts. Characterizing surfaces by embodiments of the invention does not require the prohibitively large set-ups of some optical characterization methods and may be done in the field.

DETAILED DESCRIPTION

Figure 1:
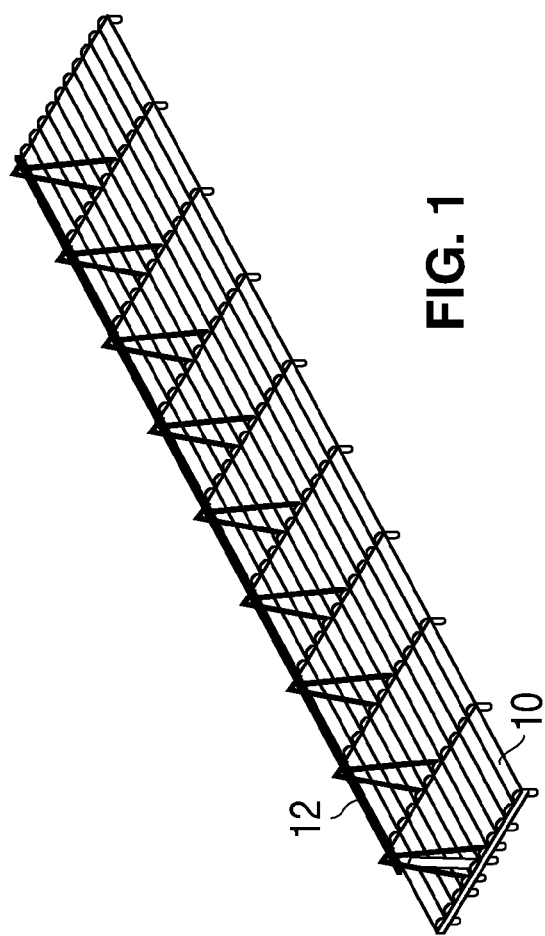
FIG. 1 illustrates an array of linear Fresnel reflectors concentrating solar radiation on an overhead pipe receiver.
Figure 2:
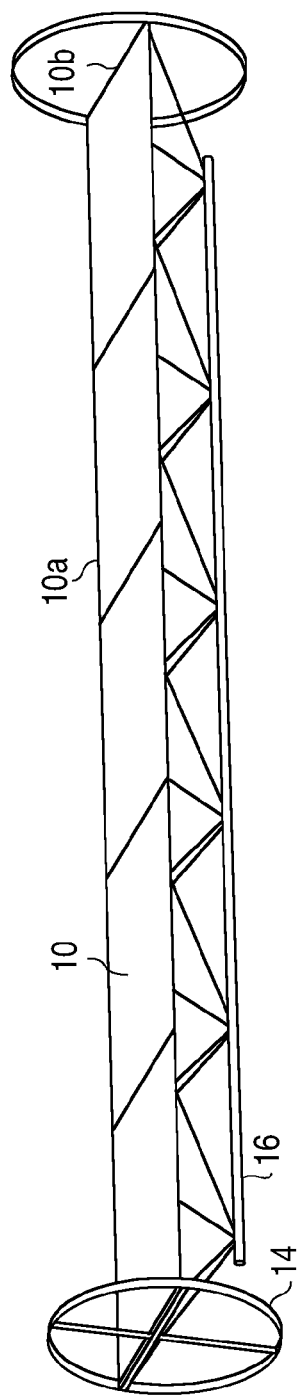
FIG. 2 illustrates a single linear Fresnel reflector.

The mirrors in a solar array may be configured to focus solar radiation on a line, such as an array of linear Fresnel reflectors as illustrated in FIG. 1. Reflectors 10 follow the path of the sun and reflect solar radiation on to one or more receivers 12 disposed over the mirrors. FIG. 2 illustrates a single mirror 10. The long side 10a of mirror 10 may have a length between 10 and 20 meters, and the short side 10b may have a length between 1 and 4 meters. The mirror may be divided into segments, each segment having a length between 1 and 5 meters. Mirrors 10 may be substantially flat, or curved along short axis 10b and substantially flat along long axis 10a. In the illustrated example, hoops 14 on either end of mirror 10 rest on bearings and can tilt the mirror around long axis 10a to follow the path of the sun but other mounting and pivoting methods are also known. The radius of curvature of the curved short side may be between 20 and 40 meters.

Figure 4:
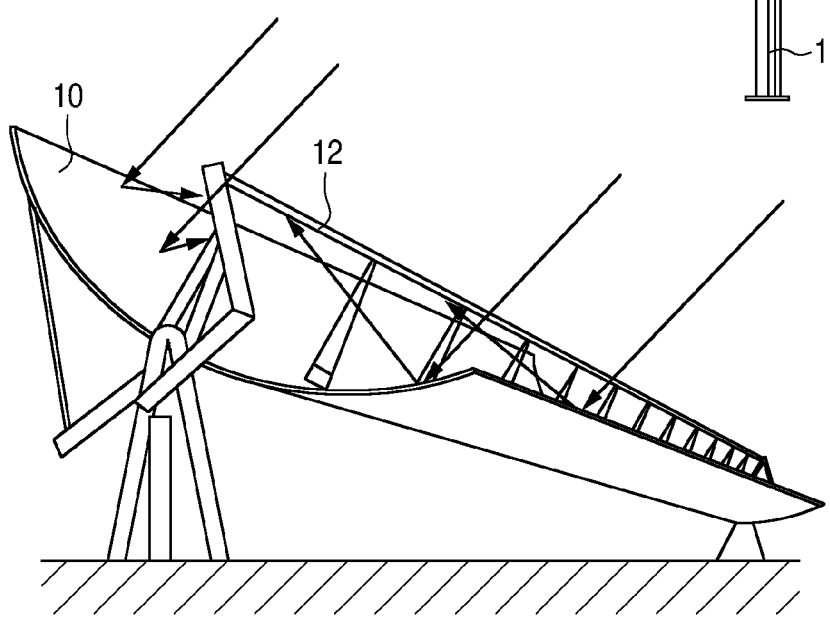
FIG. 4 illustrates a parabolic reflector.

The array illustrated in FIG. 1 is generally arranged such that several mirrors focus solar radiation on a single overhead receiver. In a parabolic reflector, as illustrated in FIG. 4, a single parabolic mirror 10 focuses solar radiation on a single receiver 12 disposed within the reflector.

Figure 3:
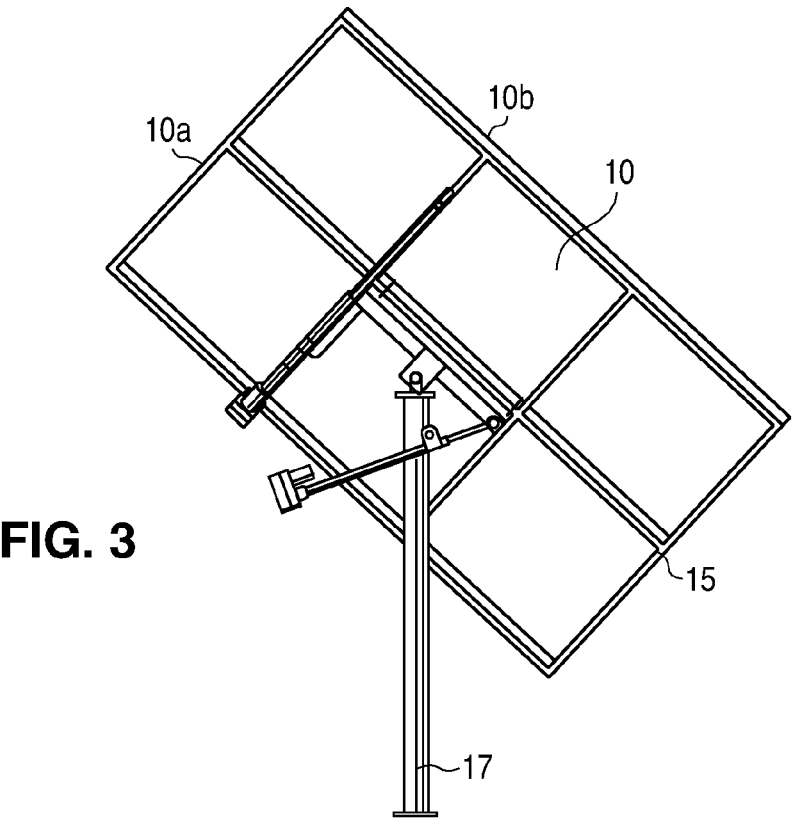
FIG. 3 illustrates a support for a heliostat.

Both the linear Fresnel reflectors and the parabolic reflectors described above focus solar radiation on a line. Alternatively, the mirrors may be configured to focus solar radiation on a small (e.g., point-like) area. An array of such mirrors, referred to herein as heliostats, may be arranged to concentrate solar radiation on a receiver tower. FIG. 3 illustrates the back side of a heliostat. A mirror 10 is mounted on frame 15. Frame 15 is mounted on support 17. Frame 15 can pivot around support 17, and tilt up or down to follow the path of the sun. The mirror mounted on frame 15 can be substantially flat, curved along one of axis 10a or axis 10b and substantially straight along the other axis, or curved along both axes 10a and 10b.

Embodiments of the invention are directed to devices and methods for characterizing surfaces including optical surfaces such as mirrors 10 described above; support surfaces such as frame 15 of FIG. 3 or a platform disposed between mirror 10 and frame 16 in FIG. 2 (the platform is not shown in FIG. 2); and manufacturing surfaces such as a table or mold used to shape flat or curved mirrors. The surfaces may be flat, or curved along one or more axes. Embodiments of the invention are particularly suited to accurately measure the curvature of large mirrors with large radii of curvature, such as the mirrors used in the arrangements described above. The radius of curvature of curved surfaces may range from a few meters to infinite (a flat surface).

Conventional techniques for characterizing the surface of a mirror include optical techniques such as the Video Scanning Harmann Optical Tester (VSHOT) technique and Fourier analysis. VSHOT requires placing a laser source at twice the focal distance from the mirror, scanning the laser across the surface of the mirror, then analyzing the location of the returned beam to determine the slope of the mirror surface at each point where the laser beam is incident. For mirrors with large focal lengths, such as the mirrors described above, placing the laser at twice the focal length requires an impractically large set-up.

Fourier analysis requires imaging a grating pattern after reflection from the mirror. Characterization of very large mirrors requires either an undesirably large and accurate pattern, or time-consuming multiple images taken from a single pattern.

Figure 5:
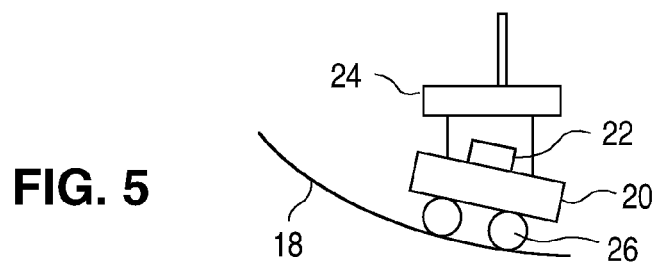
FIG. 5 illustrates a device including an inclinometer, for characterizing a surface.

In accordance with embodiments of the invention, an inclinometer is used to characterize a surface such as a mirror with a large radius of curvature. FIG. 5 illustrates an embodiment of the invention. An inclinometer 22 is disposed on a base 20. Feet 26, attached to the bottom of base 20, contact the surface 18 to be characterized. Top 24 is connected to base 20. Base 20 and feet 26 are repositioned on the surface 18 by moving top 24.

In some embodiments, three feet 26 are attached to the bottom of base 20 in a triangle. Feet 26 may be smooth plastic or any other suitable material that will not compress, in order to reduce distortion in readings taken by inclinometer 22 caused by friction between feet 26 and surface 18. Feet 26 must not damage the surface to be characterized. An example of a suitable material is Delrin™ plastic available from DuPont. Feet 26 may be fixed or may be wheels that rotate. Wheels must be mounted so as not to add any significant error to the measurements made by inclinometer 22.

Figure 6:
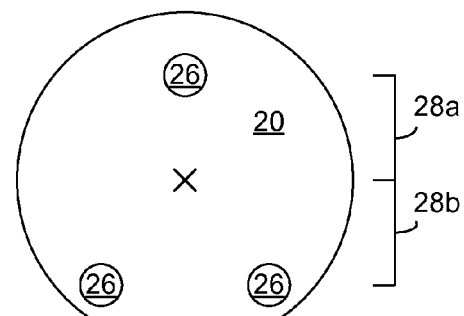
FIG. 6 is a bottom view of a base and feet.

Feet 26 may be positioned to reduce or eliminate torque caused by moving base 20, which can distort the readings taken by inclinometer 22. FIG. 6 illustrates an arrangement of feet 26 on the bottom of a base 20. The center of base 20 is shown by the X. In the illustrated embodiment, the distance 28a between the top foot 26 and the center may be the same or substantially the same as the distance 28b between the bottom feet 26 and the center. Feet 26 contact the surface at three points in the illustrated embodiment. Inclinometer 22 measures the slope at a plane defined by those three points on the surface. The closer the three points that form the triangle are together, the more accurate the slope information provided by inclinometer 22. The size of the triangle formed by feet 26 may be on the order of the size of the smallest variation in surface 18 the inclinometer is intended to measure. For example, the distance 28a+28b may be on the order of millimeters, centimeters, or tens of centimeters; for example, between 2 and 20 cm. In some embodiments, feet 26 are arranged such that distances 28a and 28b are not equal.

Base 20 is large enough to support inclinometer 22 and feet 26. Inclinometer 22 must be mounted on base 20 such that the orientation of inclinometer relative to feet 26 remains fixed. Suitable base materials include aluminum and plastic. Base 20 may be formed of the same material as feet 26. Base 20 must be connected to top 24 such that feet 26 remain in contact with the surface to be characterized. Specifically, top 24 must be able to move in pitch and yaw with respect to base 20.

Inclinometer 22 measures the slope of the mirror surface relative to gravity. Suitable inclinometers include, for example, microelectromechanical (MEMS) devices, sensors based on liquid capacitors, and fiber optic gyros. Small inclinometers are preferred because they permit the use of smaller bases that do not require a lot of power to move. When measurements along more than one axis are desired (for example, along two orthogonal axes), multiple inclinometers may be used on one base, or a single inclinometer that simultaneously measures slope on two axes. Alternatively, an inclinometer may be used first to measure slope along a first axis and then to measure slope along a second axis. The accuracy required of inclinometer 22 depends on the shape of the surface to be characterized. On surfaces where the slope changes quickly with position, more accurate inclinometers and less distance between inclinometer readings may be required, as compared to a surface where the slope changes more slowly with position. In some embodiments, inclinometer 22 is selected to be accurate to within at least 0.01°. Suitable inclinometers are available from US Digital of Vancouver, Wash.

Figure 7:
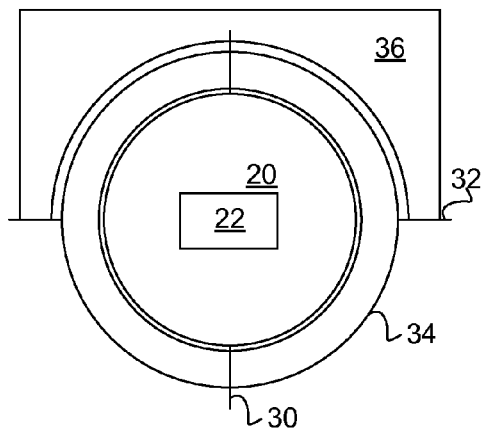
FIG. 7 is a top view of a base mounted to a gimbal ring and a handle.

FIG. 7 is a top view of another embodiment. Base 20 is connected to gimbal ring 34 such that base 20 can pivot along axis 30. Gimbal ring 34 is connected to handle 36 such that gimbal ring 34 can pivot along axis 32. As a result, feet on the underside of base 20 may be pressed against any surface, regardless of the orientation of the surface. An inclinometer 22 is disposed on the top surface of base 20.

Figure 8:
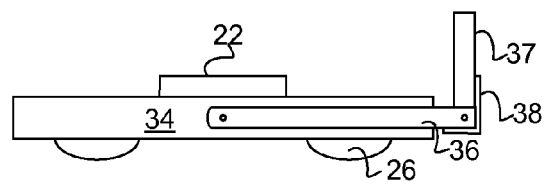
FIGS. 8 and 11 are side views of two examples of the arrangement illustrated in FIG. 7.
Figure 11:
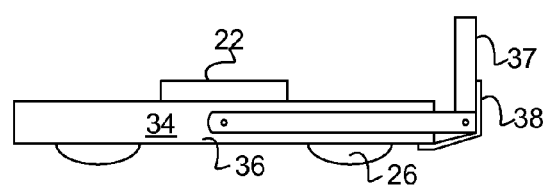

FIG. 8 is a side view of the device illustrated in FIG. 7. Handle 36 may be connected to gimbal ring 34 as low as possible, to reduce the amount of torque produced while moving base 20, thereby reducing any distortion in the readings taken by inclinometer 22 caused by the feet losing contact with the surface. A spring 38 connected between the underside of arm 37 and the underside of handle 36 keeps feet 26 of base 20 in contact with the surface to be characterized. FIG. 11 illustrates spring 38 connected between the underside of arm 37 and the underside of gimbal ring 34.

Figure 9:
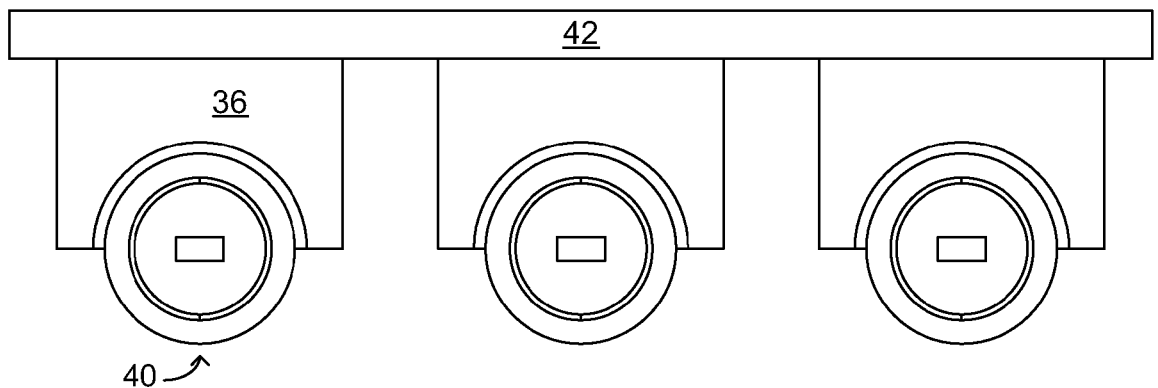
FIG. 9 illustrates three of the devices illustrated in FIG. 7 connected to an arm.

In the structure illustrated in FIG. 9, the handles 36 or arms 37 of several of the structures illustrated in FIGS. 7 and 8 are connected to an arm 42. Each of structures 40 shown in FIG. 9 may include the base 20, feet 26, inclinometer 22, and gimbal ring 34 shown in FIGS. 6 and 7. Though three of these structures 40 are illustrated in FIG. 9, it is to be understood that more or fewer may be used, depending on the surface to be characterized. Arm 42 may be connected to an actuator, which moves arm 42 along a frame, not shown in FIG. 9, moving structures 40 along the surface. The actuator may move arm 42 in one direction or two directions, depending on the number of structures 40 connected to arm 42, and the size of the surface to be characterized. The inclinometers on neighboring structures 40 may be spaced, for example, on the order of centimeters or tens of centimeters apart. For example, neighboring inclinometers may be spaced between 5 and 30 cm apart. In operation, arm 42 is positioned at the first measuring location, then lowered to place the feet of structures 40 in contact with the surface to be characterized. The inclinometer reading for each of structures 40 is recorded, then arm 42 is moved to the next measuring location. In this manner, a large surface can be quickly characterized.

Figure 10:
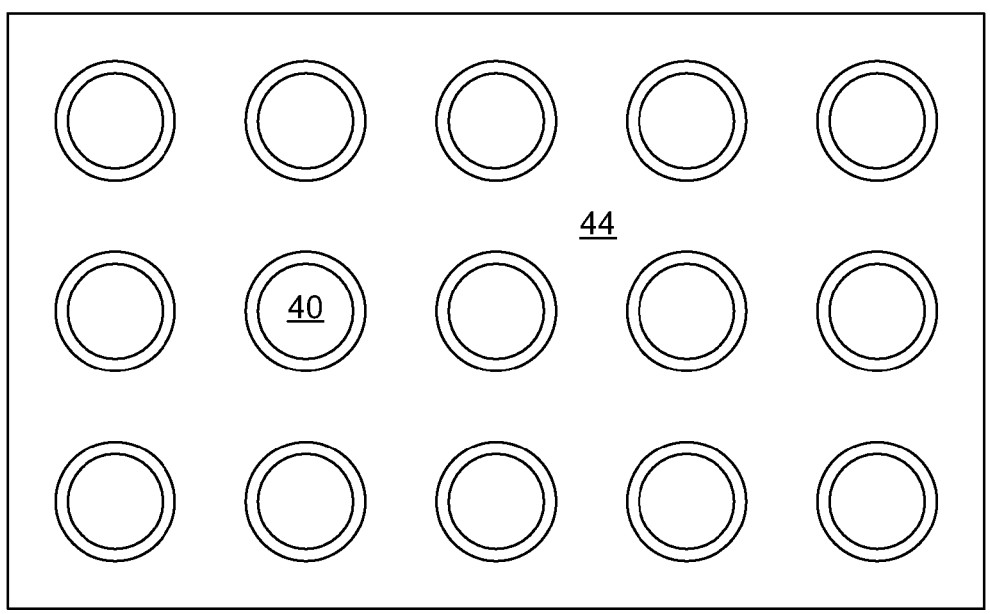
FIG. 10 illustrates an array of measuring devices.

FIG. 10 illustrates an array of structures 40 connected to a frame 44. Each of structures 40 shown in FIG. 10 may include the base 20, feet 26, inclinometer 22, and gimbal ring 34 shown in FIGS. 6 and 7. Frame 44 is lowered over a surface to be characterized until the feet of structures 40 are in contact with the surface. Springs (not shown in FIG. 10) may be connected between frame 44 and structures 40 to ensure that the feet of structures 40 stay in contact with the surface. The array illustrated in FIG. 10 may be large enough that an entire surface may be characterized without moving frame 44. Though fifteen structures 40 are illustrated in FIG. 10, it is to be understood that more or fewer may be used, depending on the surface to be characterized.

The devices and methods described above for characterizing an optical surface may offer several advantages. Unlike the optical methods for characterizing a surface described above, embodiments of the invention do not require large set-ups. Little space beyond the space the surface occupies is required. In addition, the surface that is characterized need not be oriented in any particular way. The size of devices according to embodiments of the invention are limited only by the size of available inclinometers of appropriate accuracy. Small, highly accurate inclinometers are readily available, robust, and inexpensive. The devices and methods can be readily adapted for use in the field.

Having described the invention in detail, those skilled in the art will appreciate that, given the present disclosure, modifications may be made to the invention without departing from the spirit of the inventive concept described herein.

What is being claimed is:

1. A method of characterizing a surface, using a structure comprising a measuring device comprising a base, a plurality of feet connected to the base, and an inclinometer mounted on the base, the method comprising:
    placing the plurality of feet in direct contact with the surface at a predetermined position; and
    with the inclinometer, measuring an angle of the surface relative to gravity at the predetermined position.

2. The method of claim 1 wherein the surface is a rectangular mirror having a first side between 1 and 5 meters long and a second side between 1 and 4 meters long, the mirror being curved along a first axis.

3. The method of claim 2 wherein the mirror is curved along a second axis orthogonal to the first axis.

4. The method of claim 1 wherein the predetermined position is a first predetermined position, the method further comprising:
    moving the measuring device to a second predetermined position; and
    with the inclinometer, measuring an angle of the surface relative to gravity at the second predetermined position.

5. The method of claim 1 wherein the feet comprise plastic.

6. The method of claim 1 wherein the feet form a triangle having a height between 2 and 20 cm.

7. The method of claim 1 wherein:
    the measuring device is a first measuring device;
    the structure further comprises:
        a second measuring device comprising a base, a plurality of feet connected to the base, and an inclinometer mounted on the base; and
        an arm, wherein the first and second measuring devices are connected to the arm; and
    the method further comprising moving the arm between a first predetermined position along the surface to a second predetermined position along the surface.

8. The method of claim 1, wherein the surface is an optical surface.

9. The method of claim 1, wherein the surface is a surface of a structure configured to maintain an optical surface in a predetermined curvature.

10. The method of claim 1, wherein the surface is a surface of an optical surface manufacturing mold.

11. A device comprising:
    a plurality of measuring devices, each measuring device comprising:
        a base;
        an inclinometer mounted on a top surface of the base; and
        at least one foot formed on a bottom surface of the base; and
    a structure, wherein the plurality of devices are connected to the structure.

12. The device of claim 11 wherein the structure comprises an arm and the measuring devices are connected to the arm along a major axis of the arm.

13. The device of claim 11 wherein the structure comprises a frame and the measuring devices are connected to the frame in an array.

14. The device of claim 13 wherein the frame has an area substantially the same as an area of a surface to be characterized by the measuring devices.

15. The device of claim 11 wherein the at least one foot is configured to slide across a surface without damaging the surface.

16. The device of claim 11 wherein the at least one foot comprises smooth plastic.

17. The device of claim 11 wherein each measuring device comprises three feet arranged in a triangle, wherein a distance from a first foot to a center of the base is the same as a distance between the center of the base and a center of a line between a second foot and a third foot.

18. The device of claim 11 wherein each measuring device further comprises:
    a gimbal ring attached to the base at two points on a first axis; and
    a handle attached to the gimbal ring at two points on a second axis; wherein:
        each measuring device is attached to the structure by the handle; and
        a spring is connected between each handle and one of each base and each gimbal ring, such that when the device is positioned over a surface, each spring maintains the at least one foot of each measuring device in contact with the surface.

* * * * *